US010214353B2

(12) United States Patent
 Solignac

(10) Patent No.: US 10,214,353 B2
(45) Date of Patent: Feb. 26, 2019

(54) AUTOMATED STORES AND MANUFACTURED-PRODUCT PRODUCTION UNIT COMPRISING SAME

(71) Applicant: Jean-Pierre Solignac, Saint Mathieu de Treviers (FR)

(72) Inventor: Jean-Pierre Solignac, Saint Mathieu de Treviers (FR)

(*) Notice: Subject to any disclaimer, the term of this patent is extended or adjusted under 35 U.S.C. 154(b) by 414 days.

(21) Appl. No.: 15/321,201

(22) PCT Filed: Jun. 23, 2014

(86) PCT No.: PCT/FR2014/051560
 § 371 (c)(1),
 (2) Date: Dec. 22, 2016

(87) PCT Pub. No.: WO2014/202922
 PCT Pub. Date: Dec. 24, 2014

(65) Prior Publication Data
 US 2017/0362031 A1  Dec. 21, 2017

(30) Foreign Application Priority Data

Jun. 21, 2013  (FR) ...................................... 13 01458

(51) Int. Cl.
 *B65G 1/04* (2006.01)
 *B66C 1/28* (2006.01)
 *B65G 37/02* (2006.01)

(52) U.S. Cl.
 CPC .............. *B65G 1/0464* (2013.01); *B66C 1/28* (2013.01); *B65G 37/02* (2013.01)

(58) Field of Classification Search
 CPC ........... B65G 1/0464; B66C 1/22; B66C 1/28; B66C 1/30; B66C 1/425; B66C 1/445
 See application file for complete search history.

(56) References Cited

U.S. PATENT DOCUMENTS

| 682,175 | A | * | 9/1901 | Condict | .................... | B66C 1/28 |
| | | | | | | 104/34 |
| 3,973,683 | A | * | 8/1976 | Keller | .................... | B66C 13/48 |
| | | | | | | 212/276 |
| 3,982,642 | A | * | 9/1976 | Muller | ................. | B65G 1/0464 |
| | | | | | | 212/327 |
| 4,750,132 | A | * | 6/1988 | Pessina | ................. | B65G 61/00 |
| | | | | | | 212/286 |

(Continued)

FOREIGN PATENT DOCUMENTS

| DE | 4028059 A1 | * | 3/1992 | ............. | B25J 9/026 |
| DE | 102012216434 A1 | * | 3/2014 | ............. | B66C 1/442 |

(Continued)

*Primary Examiner* — James Keenan
(74) *Attorney, Agent, or Firm* — Patshegen IP; Moshe Pinchas

(57) ABSTRACT

A warehouse for items in the form of raw materials or basic components. The warehouse includes a plurality of item storage areas, at least one upper storage area and at least one lower storage area and at least one carrier able to move items from the upper storage area to the lower storage area. The warehouse further includes at least one manipulator robot able to transfer an item between the storage areas the carrier and a workstation. Each manipulator robot is able to move over a storage area during the transporting of an item.

4 Claims, 9 Drawing Sheets

(56) References Cited

U.S. PATENT DOCUMENTS

| | | | | |
|---|---|---|---|---|
| 5,020,440 | A * | 6/1991 | Ohara | B61B 13/04 |
| | | | | 104/127 |
| 6,062,620 | A * | 5/2000 | Walker | B66C 1/28 |
| | | | | 294/67.31 |
| 6,362,443 | B1 * | 3/2002 | Kinoshita | B65G 1/0464 |
| | | | | 209/574 |
| 7,329,081 | B2 * | 2/2008 | Baker | B65G 1/04 |
| | | | | 414/268 |
| 7,562,923 | B2 * | 7/2009 | Han | H05K 13/02 |
| | | | | 294/119.1 |
| 8,075,238 | B2 * | 12/2011 | Wirz | B65G 1/0407 |
| | | | | 294/119.1 |
| 2001/0028175 | A1 * | 10/2001 | Thompson | B25J 15/026 |
| | | | | 294/119.1 |
| 2006/0056951 | A1 * | 3/2006 | Williamson | B65G 1/0464 |
| | | | | 414/626 |
| 2010/0189534 | A1 * | 7/2010 | Jung | B65G 63/004 |
| | | | | 414/281 |

FOREIGN PATENT DOCUMENTS

| | | | | |
|---|---|---|---|---|
| EP | 0999170 A1 * | 5/2000 | | B66C 1/445 |
| JP | S57124503 U * | 3/1982 | | |
| WO | WO-2014075937 A1 * | 5/2014 | | B65G 1/0464 |

\* cited by examiner

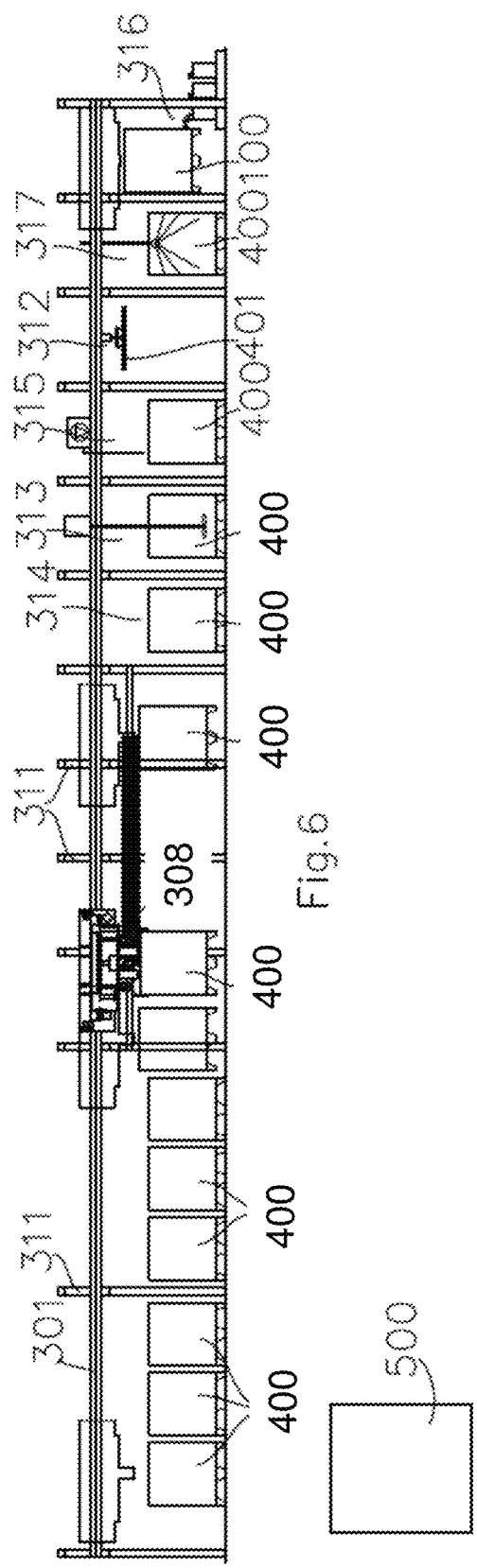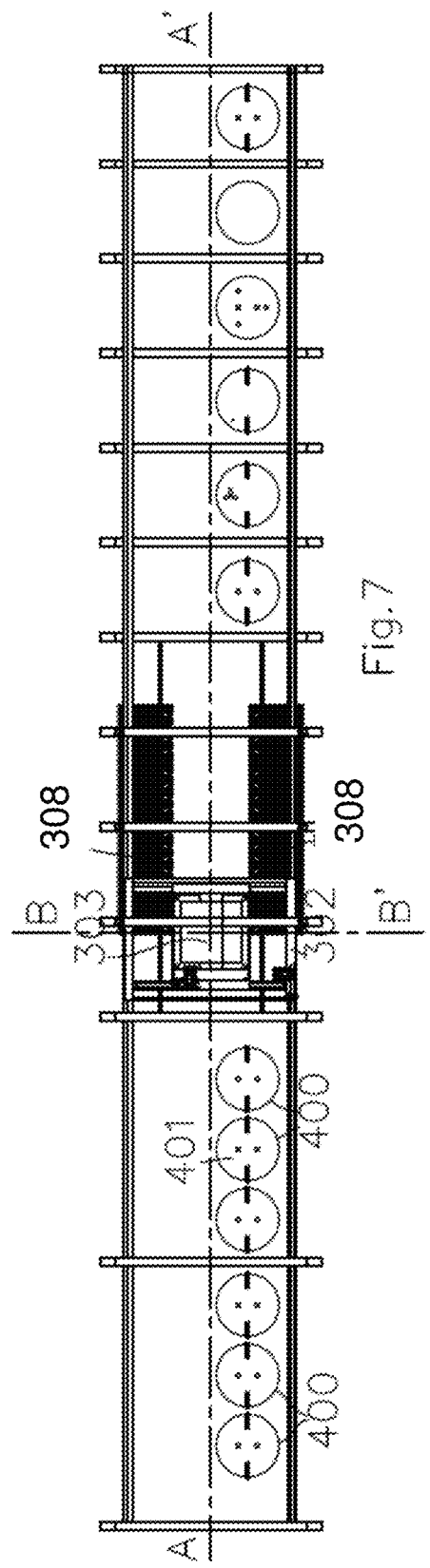

AUTOMATED STORES AND MANUFACTURED-PRODUCT PRODUCTION UNIT COMPRISING SAME

TECHNICAL FIELD OF THE INVENTION

The present invention concerns an automated warehouse and a manufactured-product production unit comprising same. The present invention belongs to the fields of equipment and techniques used for the storage and production of manufactured products.

STATE OF THE ART

Known state of the art automated warehouses consist of shelves arranged in parallel rows defining storage units identified by a computer system. These shelves extend in both height and length, and the storage units are defined by locations occupied by portions of shelves or drawers for storing items. The coordinates for each unit of a single shelf can be defined by an altitude relative to the floor and by a distance from an origin associated to the corresponding row. The shelves are generally arranged in pairs, back-to-back. These different rows are spaced regularly from each other to define circulation corridors for manipulator robots that are controlled remotely by the computer system. These manipulator robots each comprise a grasping arm that can be moved in the three dimensions of space to be brought opposite a unit, either to deposit an item to be stored there or to pick up an item from it. These items can be palletized.

Because of the dimensions of the rows, the manipulator robots are slow and the timescales for depositing or picking up an item are too long.

A state of the art such as this can be illustrated by FIG. 1, which shows an automated warehouse comprising several rows of shelves spaced apart to define circulation corridors for manipulator robots able to pick up items, in this case vats, from units of the shelves and deposit them on conveyor belts positioned between the warehouse and workstations. It can be seen in this figure that each circulation corridor leads to a horizontal conveyor associated to a workstation. Basically, this workstation comprises two continuous belts in communication with the conveyor.

Such arrangements have a number of drawbacks.

Firstly, the manipulator robots can only move within the associated corridor, and cannot be directed to another circulation corridor. Secondly, the workstations are associated to a shared conveyor to supply them or to remove manufactured products. Such an arrangement requires priorities to be set for supplying workstations, and can slow down production.

SUBJECT OF THE INVENTION

The present invention aims to remedy all or part of these drawbacks.

To this end, the present invention envisages, according to a first aspect, a warehouse for items in the form of raw materials or basic components, which comprises:
- a plurality of item storage areas, at least one storage area, referred to as upper, being superposed with at least one storage area, referred to as lower, each storage area comprising a number of item storage locations formed on the floor of said storage area;
- at least one carrier able to move items from an upper storage area to a lower storage area, and vice versa;
- for each upper storage area, at least one manipulator robot able to pick up an item from one of the storage locations and transport it to a carrier, and vice versa; and
- for each lower storage area, at least one manipulator robot able to pick up an item from one of the storage locations and transport it to a workstation, and vice versa, and able to pick up an item from the carrier and transport it to one of the storage locations or to a workstation, and vice versa, each manipulator robot being able to move over a storage area during the transport.

Thanks to these provisions, the surface area occupied by the warehouse is reduced because storage is carried out over several superposed areas.

In some particular embodiments, each storage area is flat and horizontal.

In some particular embodiments, the manipulator robot is mounted so as to be mobile on two horizontal rails fixedly installed above and at a distance from the storage area and above two sides of said storage area, and this manipulator robot comprises a motorized horizontal base mounted so as to be mobile on the two rails, said horizontal base being formed of two side-members perpendicular to the direction of the guide rails, and two end cross-members, said manipulator robot also comprising a motorized carriage mounted so as to be mobile on and along the two side-members of the motorized horizontal base, said motorized carriage bearing a grasping head movable from bottom to top and vice versa.

In some particular embodiments, the grasping head comprises a gripper comprising two opposed grasping claws, two vertical carrying arms respectively bearing the two grasping claws on their lower extremity, and an actuator motor mechanism for moving the two carrying arms further from or closer to each other.

In some particular embodiments, the actuator motor mechanism comprises a motor unit having a rotary output shaft coupled to a horizontal actuator screw, fixed in translation, comprising two opposed threaded areas, one of which has a right thread and the other a left thread, each threaded area receiving a threaded bush, fixed in rotation, one of the two carrying arms being borne by one of the threaded bushes and the other by the other threaded bush, and said carrying arms extending downwards from the threaded bushes.

In some particular embodiments, each grasping claw is in the form of a flat horizontal partition fastened by one of its edges to the corresponding carrying arm, the opposite edge of the grasping claw having a release indentation.

In some particular embodiments, the gripper of the grasping head is borne on the lower extremity of a telescopic mount of the grasping head, said telescopic mount being deployable and retractable vertically under the action of a motor mechanism.

In some particular embodiments, the telescopic mount comprises a contained lower tubular element with a straight polygonal cross-section, and a containing upper tubular element with a straight polygonal cross-section, slidingly receiving the lower tubular element.

In some particular embodiments, the motor unit for actuating the horizontal screw, said screw and the threaded bushes are mounted in the lower tubular element and said lower tubular element comprises in a lower portion a horizontal sealing partition comprising two longitudinal openings for the passage of the two carrying arms, the lower portion of each carrying arm and the grasping claws being outside the lower tubular element.

In some particular embodiments, the warehouse that is the subject of the present invention has a supporting framework and several storage areas borne by the supporting framework, said storage areas comprising their own manipulator robot, a vertical carrier being positioned between two storage areas.

In some particular embodiments, the warehouse that is the subject of the present invention comprises:
- a guide assembly positioned above the floor;
- a carrying frame, borne by and mobile on the guide assembly along a longitudinal horizontal axis of the machine; wherein at least one manipulator robot comprises:
- a transport carriage, mounted so as to be mobile on the carrying frame along a horizontal axis perpendicular to the longitudinal axis of the machine;
- a lifting means borne by said carriage, said lifting means comprising a lifting carrier element mobile along a vertical axis;
- a weighing means borne by the lifting carrier element of the lifting means, said weighing means comprising a unit on which the load to be weighed is placed; and
- a means for grasping items individually, linked mechanically to the unit of the weighing means.

In some particular embodiments, the guide assembly comprises two parallel horizontal rails positioned at the same height, said rails being secured to a supporting structure.

In some particular embodiments, the carrying frame is equipped with running gear engaged on the guide rails, the carrying frame being equipped with a motor unit to perform its movement along the rails.

In some particular embodiments, the carrying frame comprises two parallel horizontal guide rails positioned at the same height, said rails being perpendicular to the rails of the guide assembly.

In some particular embodiments, the carriage is equipped with running gear engaged on the guide rails of the carrying frame, the carriage being equipped with a motor unit (31) to perform its movement along said guide rails.

In some particular embodiments, the lifting carrier element of the lifting means is formed of a horizontal plate and this lifting carrier element is vertically movable by a motor means borne by the transport carriage, the weighing means being installed on the horizontal plate.

In some particular embodiments, the motor means of the lifting means is formed of several vertical threaded columns engaged by their upper and lower extremity in guide bearings borne by the framework of the carriage, by nuts engaged by screwing on the columns and fastened to the horizontal plate, and by a mechanism for actuating said columns in rotation around their longitudinal axis, said mechanism comprising toothed pulleys coupled respectively to the threaded columns, a toothed belt engaged on the toothed pulleys and on a toothed gear coupled to the rotary output shaft of a stepping motor fixedly installed on a suitable mount fastened to the framework of the carriage.

In some particular embodiments, the weighing means is formed of at least one balance comprising a pan.

In some particular embodiments, the grasping means is formed of two vertical arms equipped in their lower extremity with two grasping hooks.

In some particular embodiments, the two arms of the grasping system are secured to the pan of the balance.

In some particular embodiments, each hook is formed of a triangular-shaped vertical plate, mounted on a horizontal baseplate, pointing upwards.

In some particular embodiments, the warehouse that is the subject of the present invention is equipped with a processing and management unit able to process the different electrical signals that it receives from the various components, and able to manage their operation.

With respect to the production units, known warehouses are only used for storage and are not designed to be incorporated in a manufacturing process. A process in which execution of a production order entails stopping at different workstations can only operate correctly if a buffer area is incorporated between each workstation. A buffer area makes it possible for each workstation to be autonomously able to manage the order in which the production orders pass each workstation based on the priorities, and to prevent production being blocked if one of the workstations malfunctions or is unavailable.

Conventionally, these buffer areas are formed by handling conveyors, temporary storage conveyors, and a switching network.

According to a second aspect, the present invention envisages a production unit for manufactured products, which comprises:
- a warehouse that is the subject of the present invention; and
- at least one workstation near the warehouse, each workstation being positioned adjacent to a storage area of the warehouse.

BRIEF DESCRIPTION OF THE FIGURES

Other advantages, aims and characteristics of the invention will become clear on reading the description of a preferred form of embodiment, given as a non-limiting example with reference to the drawings included in an appendix, in which:

FIG. 2a is a side view of a production unit that is the subject of the present invention;

FIG. 2b is a top view of the production unit illustrated in FIG. 2a;

FIG. 2c is a front view of the production unit illustrated in FIGS. 2a and 2b;

FIG. 6 is a side view of a machine complying with the invention, according to a first form of embodiment, with different positions of the carrying frame and transport carriage assembly;

FIG. 7 is a top view of the machine according to FIG. 6;

Figure 1:
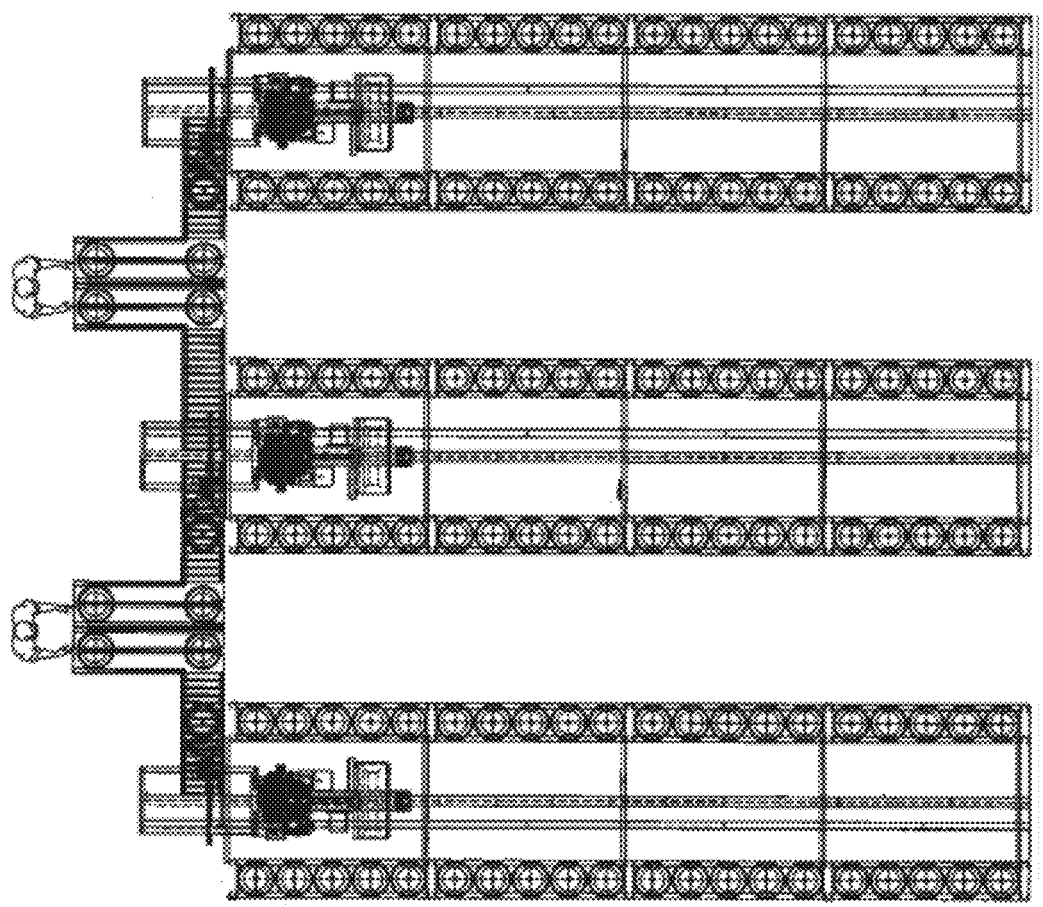
FIG. 1 is a top view of an automated warehouse known in prior art.

DESCRIPTION OF EXAMPLES OF
REALIZATION OF THE INVENTION

As shown, the production unit for manufactured products comprises a warehouse 1 (FIG. 3) for items in the form of raw materials or basic components, and at least one workstation T (FIG. 2b) positioned adjacent to the warehouse. The production unit also comprises a processing and control unit 3, which controls at least one manipulator robot 2.

The warehouse 1 comprises locations 11 for storing items, and at least one manipulator robot 2 able to pick up an item from one of the storage locations 11 so that it can be transported to a workstation T. Reciprocally, the manipulator robot 2 is able to pick up the items at each workstation T for, in particular, transporting them to one of the storage locations 11 or to another workstation T.

The warehouse 1 is formed of at least one area 10 for storing items, comprising several locations 11 for storing items, locations formed on the floor of said storage area 10. Each manipulator robot 2 is able to move over at least one storage area 10, or a portion of the latter, with a view to transporting items between at least one workstation T and one said storage area 10, and vice versa.

Figure 3:
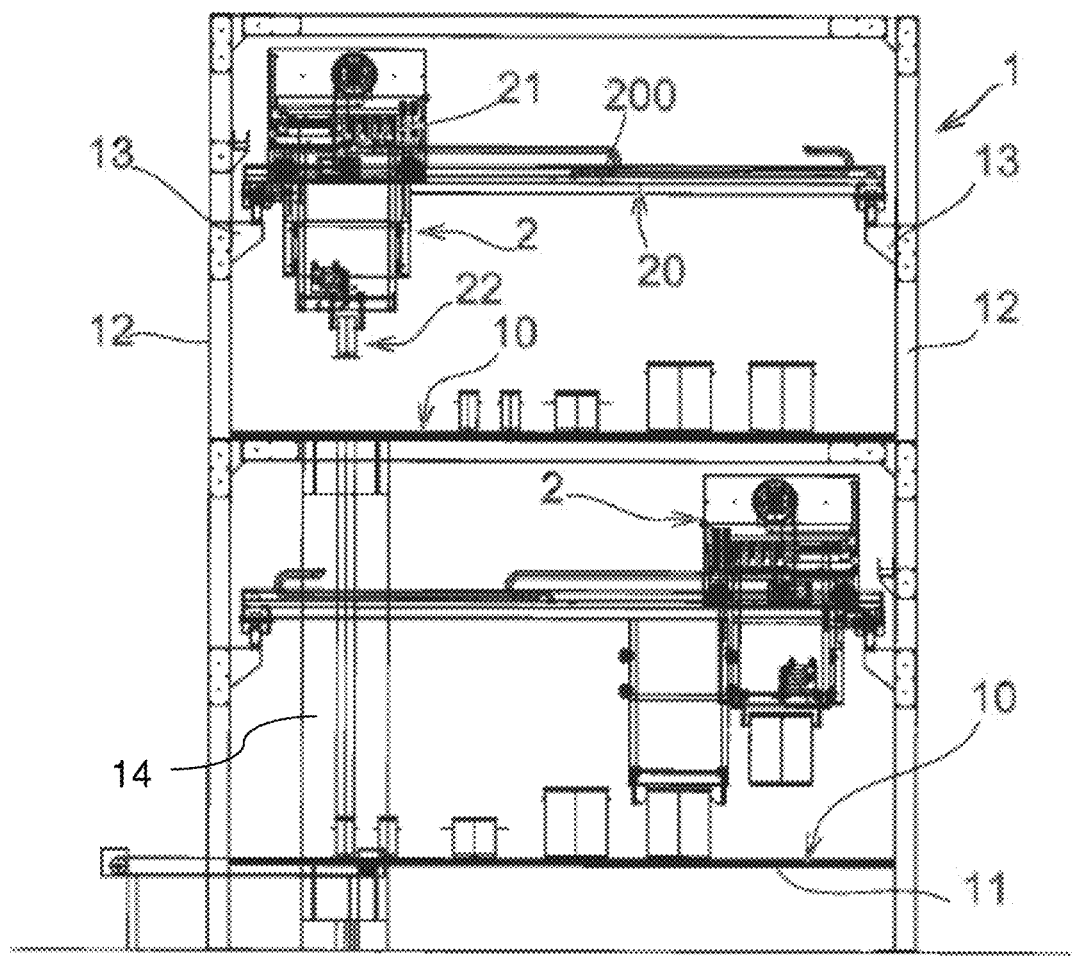
FIG. 3 is a top view of a warehouse comprising several superposed storage areas.

As can be seen in FIG. 3, the storage area 10 is flat and horizontal, and can be formed of a cement floor or by a raised floor, of grating type for example.

The warehouse 1 also comprises a metal supporting framework, formed of vertical uprights 12 braced correctly. These uprights 12 carry, at a distance from the floor, two parallel horizontal guide rails 13, designed to receive the manipulator robot 2.

Each manipulator robot 2 can move along the length of the guide rails 13 or only over a fraction of the length of these rails 13. According to a preferred form of embodiment, a manipulator robot 2 comprises a motorized horizontal base 20 mounted so as to be mobile on the two rails, and a motorized carriage 21 mounted so as to be mobile on the horizontal base 20.

The horizontal base is formed of two side-members 200 perpendicular to the general direction of the guide rails 13. These side-members 200 are rigidly joined together at their extremities by bracing cross-members. This horizontal base is equipped with rollers by means of which it rests on the guide rails. At least one of these rollers is coupled to a motor unit, for example a stepping or encoder type, to control the movement and the position of the base along the rails 13.

Figure 2:
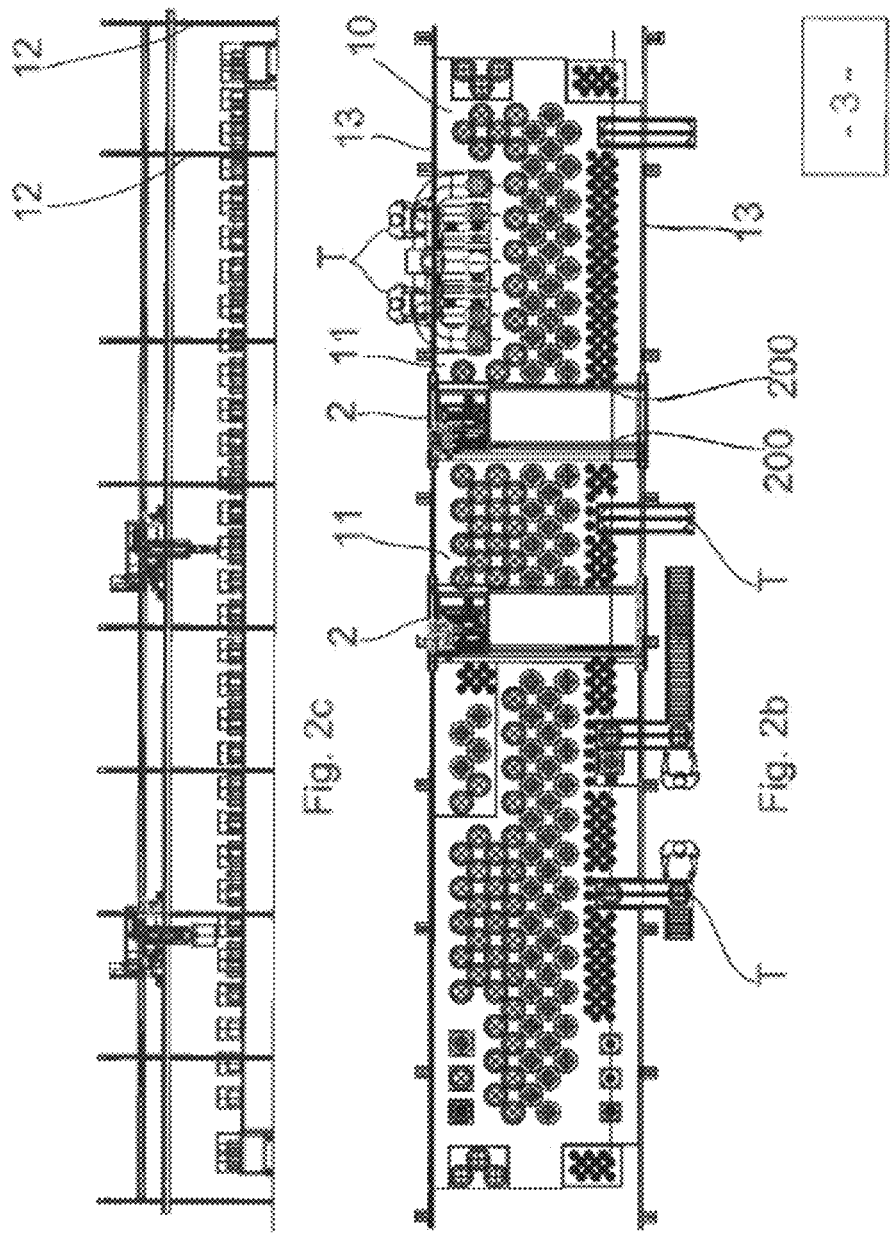

The motorized carriage 21 is mounted so as to be mobile on and along the two side-members 200 (FIGS. 2b and 3). This carriage is equipped with rollers by means of which it rests on the side-members 200. The side-members 200 are arranged as a guide rail. At least one of the rollers is coupled to a motor unit, for example a stepping or encoder type, to control the movement and the position of the carriage along the side-members 200. The carriage 21 bears a grasping head 22, movable from bottom to top and vice versa due to the action of a motor unit.

Figure 4:
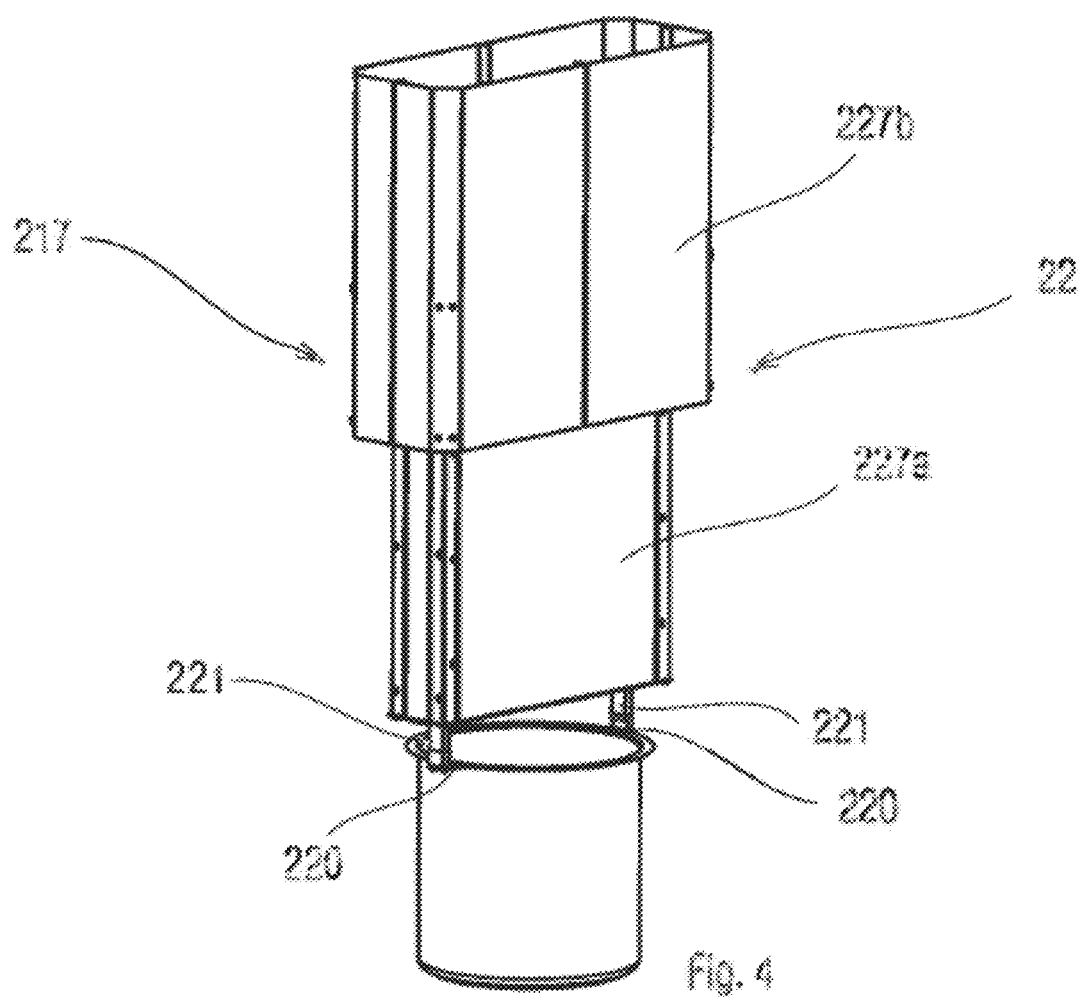
FIG. 4 is a perspective view of a grasping head.
Figure 5:
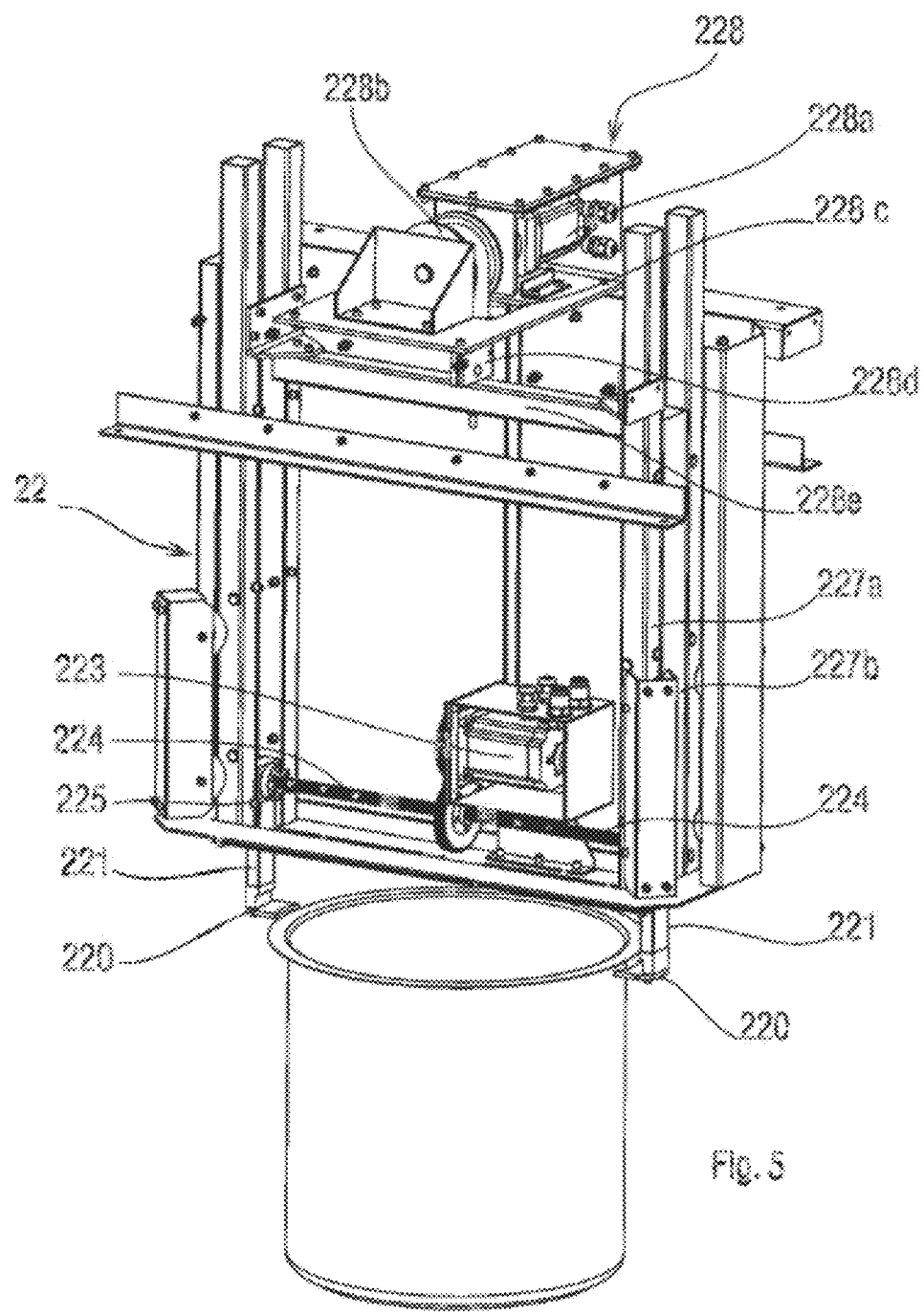
FIG. 5 is a cutaway view of a grasping head.
Figure 8:
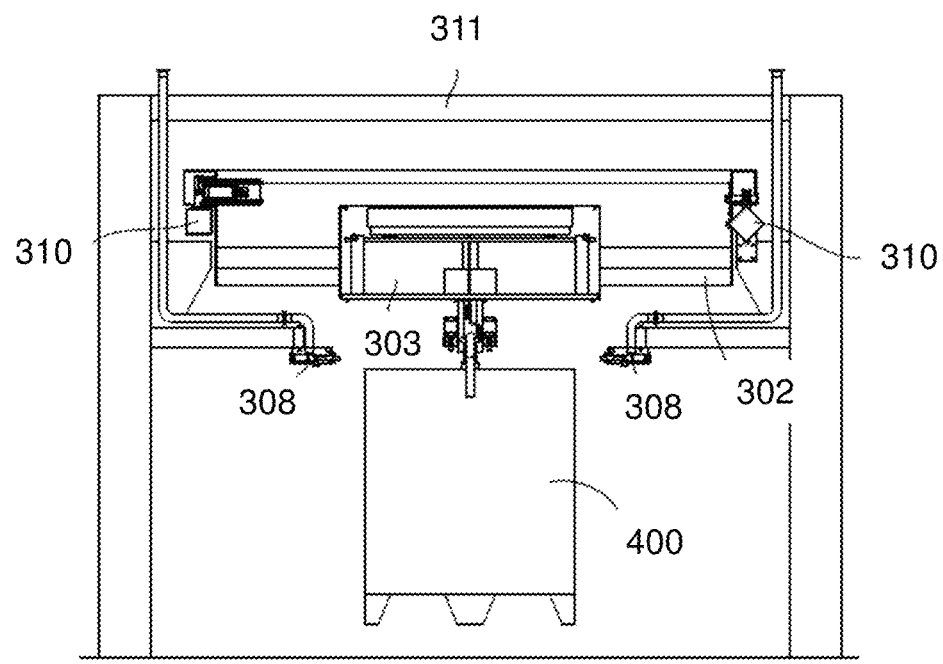
FIG. 8 is a front view of the machine according to FIG. 6.
Figure 9:
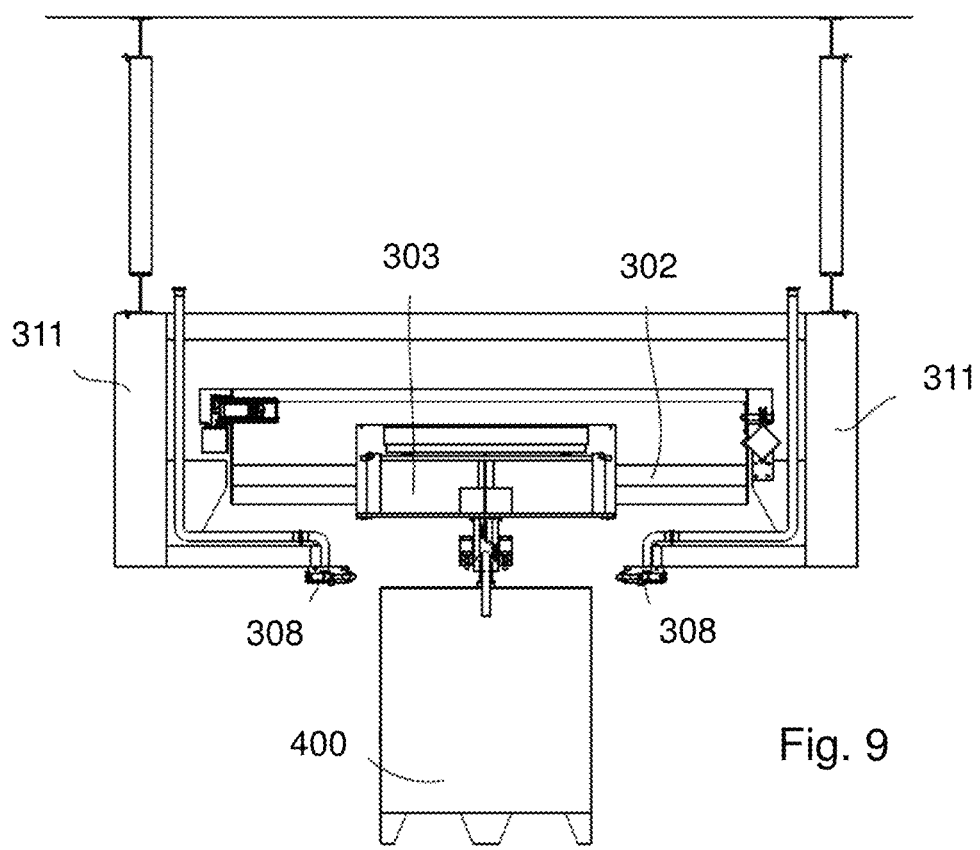
FIG. 9 is a front view of a machine according to a second form of embodiment.
Figure 10:
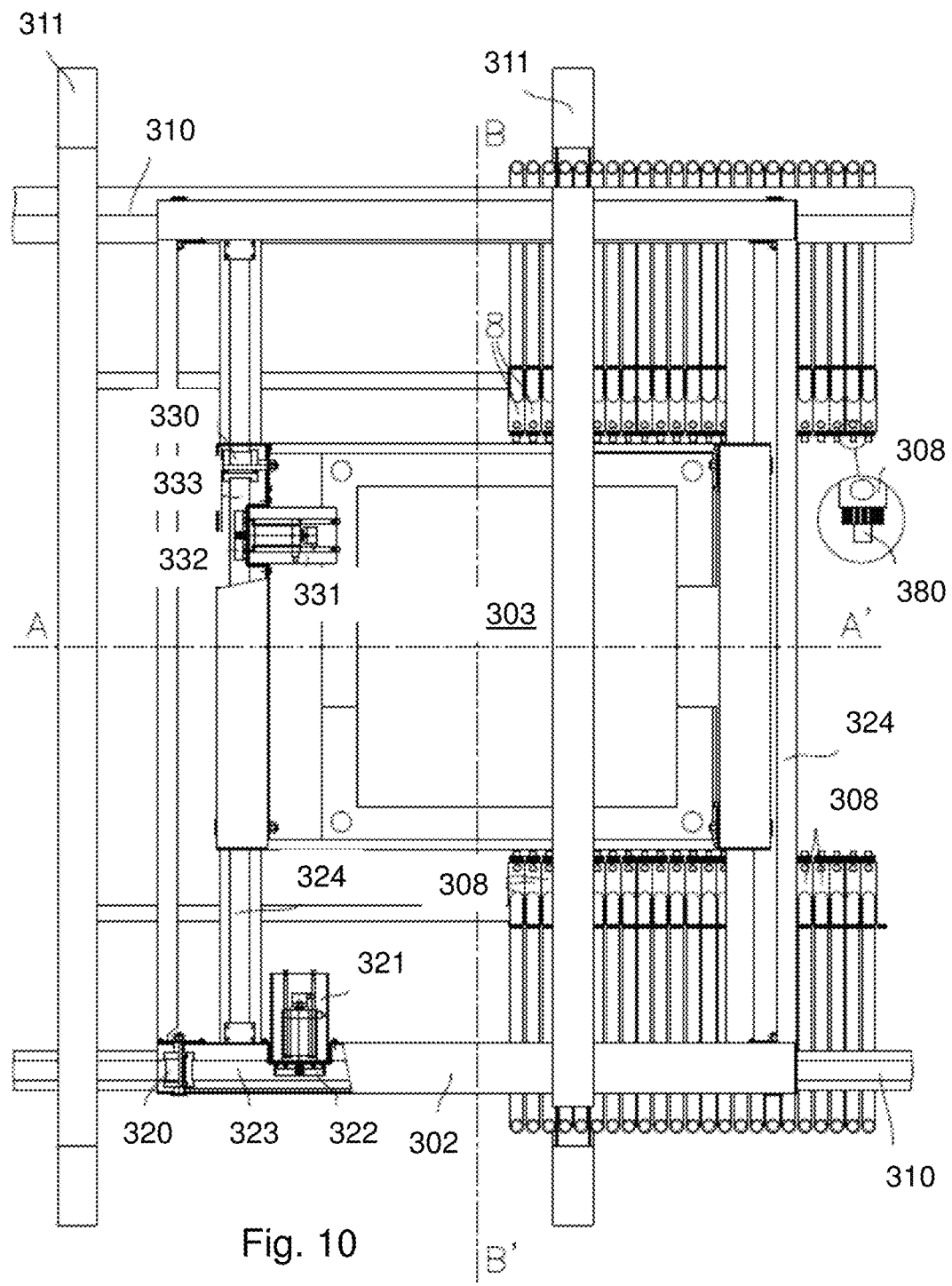
FIG. 10 is a detail view from above of a machine according to the invention, showing the carrying frame and the transport carriage.
Figure 11:
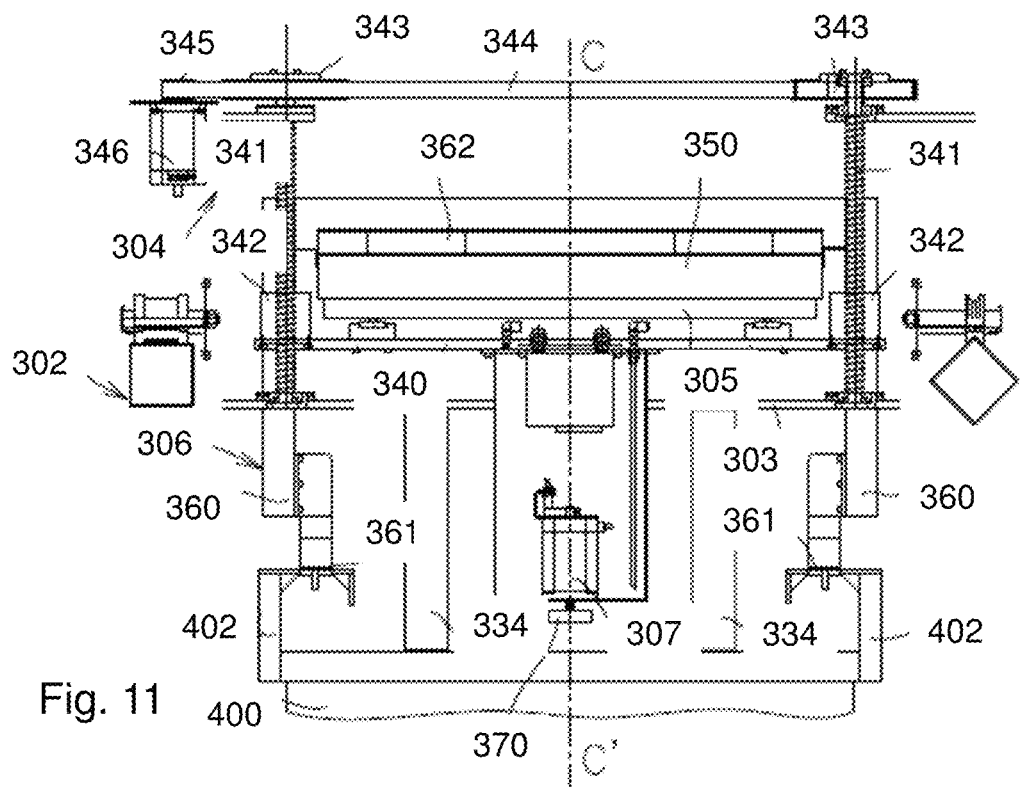
FIG. 11 is a view of the transport carriage of the machine according to the invention.
Figure 12:
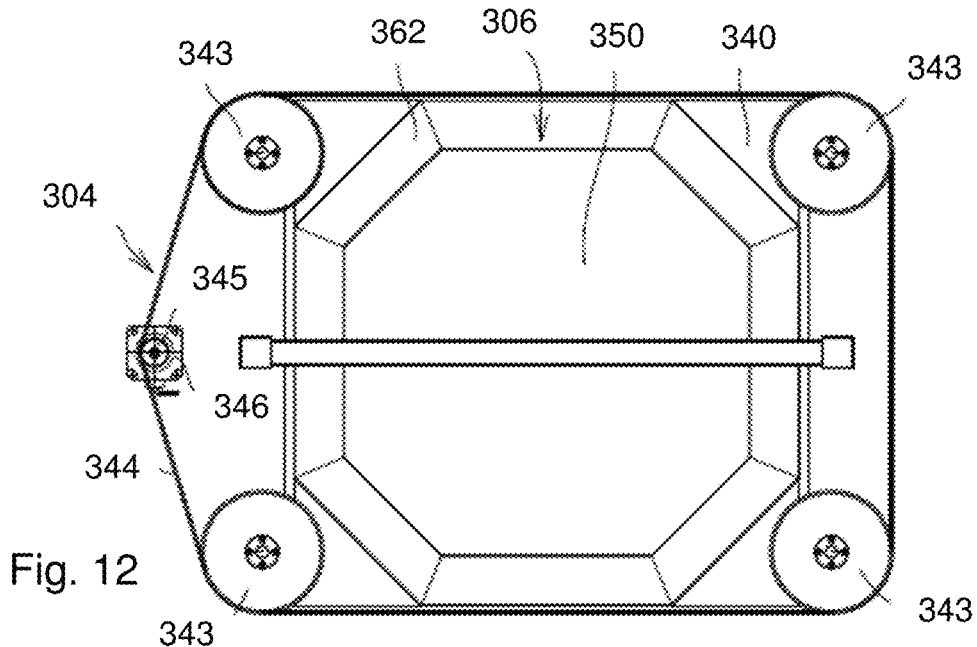
FIG. 12 is a top view of the lifting means.

As can be seen in FIGS. 4 and 5, the grasping head 22 comprises a gripper comprising two opposed grasping claws 220, two vertical carrying arms 221 respectively bearing the two grasping claws on their lower extremity, and an actuator motor mechanism for moving the two carrying arms further from or closer to each other.

The manipulator robot 2 under the control of the processing unit 3 can therefore first be brought above a storage location 11 to pick up an item from it and then transport this item to a workstation T. Alternatively, after processing, the item can be picked up by the manipulator robot 2 from the workstation T and transported to a temporary storage location 11.

According to the preferred form of embodiment, each claw 220 is in the form of a flat horizontal partition fastened by one of its edges to the corresponding carrying arm 221, the opposite edge of the grasping claw having, for example, a release indentation. The claws 220, by their indented edge, are turned towards each other.

Still according to a preferred form of embodiment, the actuator motor mechanism for moving the two carrying arms 221 further from or closer to each other comprises a motor unit 223 having a rotary output shaft coupled to a horizontal actuator screw 224, fixed in translation, comprising two opposed threaded areas, one of which has a right thread and the other a left thread. Each threaded area receives a threaded bush 225, fixed in rotation, one of the two carrying arms 221 being borne by one of the threaded bushes 225 and the other by the other threaded bush. The two carrying arms extend downwards from the threaded bushes. The motor unit 223 is, for example, a stepping motor.

Advantageously, the gripper is borne on the lower extremity of a telescopic mount 227 with which the grasping head 22 is equipped. The telescopic mount 227 is deployable and retractable vertically under the action of a motor mechanism 228 controlled by the processing unit 3.

The telescopic mount 227 comprises a contained lower tubular element 227a with a straight polygonal cross-section, bearing the gripper, and a containing upper tubular element 227b with a straight polygonal cross-section. The upper tubular element 227b slidingly receives the lower tubular element. Such a layout with a straight polygonal cross-section provides an effective counter to the rotation of the lower tubular element relative to the upper tubular element. The grasping system is borne by the lower element of two elements sliding relative to each other. This feature makes it possible to:

grasp items of different heights in the storage area;
reduce the height dimension of the carriage, and thus optimize the use of space; and
have the transported items travel above the stored items and thus in spaces reserved for circulation.

Unlike conventional systems, the entire surface area of the warehouse is used as a storage area.

The motor means 228 acts on the lower tubular element 227a to move it vertically in the upper tubular element 227b, either upwards, ie in the retraction direction, or downwards, ie in the deployment direction.

According to a preferred form of embodiment, the motor means 228 is formed by an electrical motor 228a mounted fixedly on the upper extremity of the upper tubular element 227b. This motor 228a comprises a rotary output shaft on which a smooth pulley 228b is seated. A belt 228c moves round on the rim of the smooth pulley 228b. The lower extremity of the belt 228c is enclosed between the teeth of a gripper system 228d fastened to a horizontal cross-member 228e inside the lower tubular cross-member 227a, and fastened in the upper portion of the lower tubular cross-member 227a. Alternatively, the motor means 228 is formed of a known type of actuator.

The actuator motor 223 of the screw 224, the screw 224 and the threaded bushes 225 are mounted in the lower tubular element 227a. The lower tubular element 227a comprises, in a lower portion, a horizontal sealing partition. This horizontal sealing partition comprises two longitudinal openings for the passage of the two carrying arms. The lower portion of each arm and the grasping claws 220 are outside the lower tubular element 227a. This layout of openings immobilizes the arm in rotation relative to the screw 224 and, as a result, immobilizes the threaded bushes 225 in rotation. This sealing plate receives, in the volume of the lower tubular element 227a, a mount onto which the actuator motor 223 is fastened. The output shaft of the actuator motor 223 is coupled to the screw 224, by the intermediary of a gear wheel drive. The screw 224, via its smooth extremities, is engaged in two shaft bearings fastened to the lower tubular element 227*a*.

In a preferred form of embodiment, in its interior volume, the lower tubular element 227*a* is equipped with vertical guide columns with which rollers, mounted in crosspieces fastened to the upper tubular element 227*b*, cooperate in guidance.

In a variant according to another provision of the invention, the warehouse 1 of the production unit comprises several storage areas 10 borne by the supporting framework. The storage areas 10 each comprise their own manipulator robot 2. In addition, a vertical carrier 14, known per se, is positioned from an upper storage area 10 to a lower storage area 10. This vertical carrier can be formed of a lifting device controlled by the processing and control unit 3.

The processing and control unit 3 controls the various motors of the manipulator robot 2, according to orders received. This processing and control unit 3, for the purpose of organizing a production process, automatically manages the storage and provision to different assembly or inspection workstations T of a sub-assembly of parts or of parts that must join a sub-assembly.

The processing and control unit 3 also controls the operations carried out on the various workstations T, monitors and tracks their execution, the time taken for each and their status (to be performed, in progress, terminated).

In addition to the conventional recognition systems such as barcodes and RFID (acronym for "Radio Frequency IDentification") chips, the or each manipulator robot can be equipped with weighing systems making it possible to recognize parts and sub-assemblies or to control the execution of different tasks of the process by managing and monitoring their weight. In addition, in some embodiments, the picking up and automated weighing is performed for a part that must undergo modifications, for example such as the application of a special coating or paint or assembly to another part or to a sub-assembly, for which the quality of the execution can be controlled through the change in the weight of the part or of the sub-assembly.

The weighing system is connected electrically to the processing unit 3. This system can be associated to each arm 221 or to each pallet claw 220 and be constituted of a set of load cells, known per se, or by a set of strain gages, known per se.

As can be seen by reading the description above, the warehouse 1 for items in the form of raw materials or basic components, comprises:
  a plurality of item storage areas 10, at least one storage area 10, referred to as upper, being superposed with at least one storage area, referred to as lower, each storage area 10 comprising a number of item storage locations 11 formed on the floor of said storage area 10;
  at least one carrier able to move items from an upper storage area 10 to a lower storage area 10, and vice versa;
  for each upper storage area, at least one manipulator robot 2 able to pick up an item from one of the storage locations 11 and transport it to a carrier, and vice versa; and
  for each lower storage area, at least one manipulator robot 2 able to pick up an item from one of the storage locations 11 and transport it to a workstation T, and vice versa, and able to pick up an item from the carrier and transport it to one of the storage locations 11 or to a workstation T, and vice versa, each manipulator robot 2 being able to move over a storage area 10 during the transport.

In the embodiment shown in FIGS. 6 to 11, the warehouse according to the invention comprises a unit for processing and managing signals 500, a guide assembly 301 positioned above a storage area, a carrying frame 302 borne by and mobile on the guide assembly 301 along a longitudinal horizontal axis AA' of the machine.

Each manipulator robot comprises a transport carriage 303, mounted so as to be mobile on the carrying frame 302 along a horizontal axis BB' perpendicular to the longitudinal axis AA' of the machine, a lifting means 304 borne by said carriage 303, said lifting means 304 comprising a lifting carrier element 340 mobile along a vertical axis CC', a weighing means 305 borne by the lifting carrier element 340 of said lifting means 304, a means for grasping 306 items 400 individually, linked mechanically to the weighing means 305. More specifically, the means for grasping 306 items 400 is mechanically linked to a unit 350 of the weighing means 305 designed to receive the load to be weighed.

Preferably, the removal or addition of a portion of the item 400, during the movement, or between two movements, of the item 400, is detected by weighing, preferably continuously, the item 400 during the item's movement.

As can be seen, the machine extends over a storage zone for items 400, in which the items 400 occupy assigned positions and are, for example, arranged in rows and columns.

The processing and management unit 500, known per se, which the machine comprises is able to process the different electrical signals it receives from components of the machine, and to control their operation.

The guide assembly 301, according to the preferred form of embodiment, comprises two parallel horizontal rails 310 positioned at the same height, these rails being secured to a supporting structure 311. This supporting structure 311 is advantageously formed of vertical uprights fastened to the framework of the building housing the machine or, according to another form of embodiment, formed of gantries resting by their uprights on the floor of the building.

The guide assembly may be organized into modules, joined together by any means known to the man skilled in the art.

The carrying frame 302 is in the form of a structure. This frame 302 is equipped with running gear 320, engaged on the guide rails 310, and a motor unit, to perform its movement along the rails. Preferably, the motor means comprises, firstly, an electric stepping motor 321, whose rotary output shaft is equipped with a toothed gear 322, and, secondly, a rack 323 with which said toothed gear meshes. In practice, the toothed gear 322 is formed of a toothed pulley, and the rack of a toothed belt positioned flat on one of the guide rails 310.

Such an arrangement is favorable to controlling the movement of the carrying frame 302 along the rails 310 and to controlling the latter's position. This position is determined as known by counting the number of electrical pulses delivered to the stepping motor.

For absolute control of the movement and position of the frame, an encoder known per se may be coupled to the output shaft of the stepping motor.

To minimize the consequences due to the loss of information about the position of the carrying frame along the rails 310, a mechanical stop is provided, fixedly installed on the guide assembly. This mechanical stop forms a positional reference point. If there is a loss of information, the carrying frame 303 is brought against the stop to initialize its position.

The carrying frame 302 comprises two parallel horizontal guide rails 324 positioned at the same height, said rails 324 being perpendicular to the guide rails 310 of the guide assembly 301.

The carriage 303 comprises a three-dimensional framework formed by an assembly of side-members, uprights and cross-members. This framework, in the lower portion, is equipped with running gear 330, engaged on the guide rails 324 of the carrying frame, and bears a motor unit able to perform its movement along the guide rails 324. As described above, the motor means comprises, firstly, an electric stepping motor 331, whose rotary output shaft is equipped with a toothed gear 332, and, secondly, a rack 333 with which the toothed gear 322 meshes. Preferably, the toothed gear 332 is formed of a toothed pulley, and the rack is formed of a toothed belt positioned flat on one of the guide rails 324. The movement and position of the carriage 303 are controlled by counting the number of electrical pulses delivered to the stepping motor 331.

An encoder known per se may be coupled to the output shaft of the stepping motor to provide absolute control of the movement and position of the transport carriage.

Lastly, to minimize the consequences due to the loss of information about the position of the carriage along the rails 324, a mechanical stop is fixedly installed on the carrying frame. This mechanical stop forms a positional reference point for the carriage, such that if there is a loss of information about the position of the carriage, it can be brought against the stop to initialize its position.

The lifting means 304, borne by the transport carriage, comprises a lifting carrier element 340 vertically movable by a motor means borne by the transport carriage 303, the weighing means 305 being installed on the lifting carrier element 340. This lifting carrier element is advantageously formed of a horizontal plate 340.

The motor means can be an electric actuator, pneumatic actuator, inflatable pockets, or other suitable motor units known to the person skilled in the art. But preferably the motor means is formed of several vertical threaded columns 341 engaged by their upper and lower extremity in guide bearings borne by the framework of the transport carriage, by nuts 342 engaged by screwing on the columns 341 and fastened to the horizontal plate 340, and by a mechanism for actuating said columns 341 in rotation around their longitudinal axis.

The actuator mechanism comprises toothed pulleys 343 coupled respectively to the threaded columns 341, a toothed belt 344 engaged on the toothed pulleys 343 and on a toothed gear 345 coupled to the rotary output shaft of a stepping motor 346 fixedly installed on a suitable mount fastened to the framework of the carriage. This arrangement of stepping motor, toothed gear, toothed pulleys and toothed belt makes it possible to rigorously control the movement and position in height of the plate 340.

Advantageously, the weighing means 305 is formed of at least one pan balance, the pan of this balance forming the unit 350 on which the load to be weighed is placed. The weighing means can be formed of a single balance, but, in a variant, it can be formed of several superposed balances with different precisions and weighing ranges. The balance is able to produce an electrical signal representative of the value of the weighing charge it bears. This signal is then processed by the processing and management unit 500.

The grasping means 306, associated to the weighing means, is formed of two vertical arms 360, each equipped in the lower extremity with a grasping hook 361. These two arms are secured to the pan 350 of the balance 305. In practice, the two vertical arms 360 are fastened by their upper extremity to a frame 362 affixed to the pan of the balance 305.

Preferably, the carriage 303 is equipped with a protective casing enclosing its mechanical and electrical elements, said carriage 303, by this protective casing, being above the terminals of collection devices. The enclosure layout and the position of this enclosure prevent the raw materials, should there be a leak, from coming into contact with the mechanical and electrical elements of the carriage.

Using the grasping means, as described, the carriage 303 picks up the item 400 designated by the processing and management unit. By actuating the actuator mechanism of the columns 341, the pan 340, the balance and the grasping means are moved vertically upwards and the item 400 is lifted from the floor to be weighed and transported. Advantageously, the item 400 is only lifted a couple of millimeters, which increases the safety of its transport.

By the movement of the carrying frame 302 along the rails 310 and the movement of the transport carriage along the rails 324, the item 400 and the carriage are positioned opposite the collection device designated by the processing and management unit. More specifically, the carrying frame 302 is moved along the guide rails 310 to bring the carriage 303 opposite the designated collection and delivery device, and then the carriage 303 is moved over the guide rails 324 towards the selected collection device 308 such that the actuator mechanism 307 with which it is equipped is brought into correspondence with the control unit 380 of the collection device 308.

The operation of the machine is as follows: the carriage 303 is automatically positioned within the storage zone above the item 400. The grasping means is lowered so as to come into touch with the item 400, and the item is lifted several millimeters above the floor and transported. It is noted that transport at very short distance from the floor contributes to the safety of this operation. It is also noted that the item 400 is weighed at least once, and preferably at least at each end of the path followed by the item 400. In this way, it is determined whether the item 400 has been modified, deliberately or accidentally, by adding or removing one of its parts.

After being processed at a workstation, the item 400 can be brought to its storage area, or be transported by the carriage to various modules 312, 313, 314, 315, 316 and 317 borne by or associated to the structure of the guide assembly.

The purpose of the packing module 316 is to pack the contents of at least one of the items 400 in suitable containers of smaller size, eg bottles or other. The quantity of parts of the items removed is checked by weighing and comparison with the loss of weight expected by the stock management system.

Preferably, these modules 312-317 are fixed relative to the machine structure and form various workstations, but in a variant one or more of these modules are embedded on the transport carriage such that several operations can be performed in parallel or simultaneously.

According to a second form of embodiment, the grasping hooks are each formed of a triangular vertical plate mounted on a horizontal baseplate, pointing upwards, and the item comprises two diametrically opposed oblong grasping openings, designed to receive the hooks formed in at least one external radial protrusion in the form, for example, of a flange. This arrangement of triangular grasping hooks and oblong openings allow items 400 to be picked up, men if they are slightly offset relative to their storage location, and therefore allows these hems 400 to be centered relative to the grasping means while being picked up.

The oblong openings each extend in a circumferential arc centered on the axis of revolution of the item 400. This arrangement makes it possible to compensate for a poor angular positioning of the item 400 around its vertical axis of revolution and to re-establish a suitable angular position of the item 400. In addition, the length of the base of each grasping hook is one to two millimeters smaller than the length of the line subtending the circumferential arc mentioned above, for relatively accurate centering. While suspended the item 400 rests, by the lower surface of the flange 110, on the horizontal baseplate of each hook.

Because of an offset that is too great, the item 400 can be on the trajectory of the grasping means. If this is the case, the grasping means could hit the item 400. The resulting impact is detected by the weighing means and an electrical signal is received by the processing and management unit 500. Because of the cylindrical form of the item 400, and as a result of the impact, the transport carriage experiences a lateral push causing it to move in one direction or another. By analyzing the movement direction of this carriage, the processing unit will be able to determine the right or left nature of the offset of the item 400 relative to its nominal location. It is therefore possible, by small step-by-step movements, to position the grasping means suitably relative to the item 400 such that the item is picked up and returned in its location.

The machine as described above also allows the picking up and automated weighing of a part that must undergo modifications, such as a surface treatment consisting, for example, of the application of a special coating, paint, varnish, adhesive or sandblasting, for which the quality of the execution can be controlled through the change in its weight.

One example of application of the invention is organizing and managing the production of compositions of raw material (eg flavors and perfumes).

Therefore, the processing and control unit 3 automatically manages, depending on the applications:
 storing clean, empty jars waiting to receive a composition;
 making containers available on input to composition machines;
 collecting containers on output from production machines;
 quarantining containers according to defined criteria;
 making containers available at manual weighing stations for adding to;
 positioning a container on a stirring station for a given period of time;
 positioning containers on a heating or cooling station;
 making several containers that have to be assembled available at a so-called consolidation station;
 making containers available at stations inspecting, for example, colorimetry or chromatography; and/or
 making containers whose production is complete available automatically or on request.

Benefits of the Invention.

The production unit and warehouse that are the subjects of the present invention provide the following benefits.

The workstations are supplied in an organized, coordinated way according to their function and their availability. One of the great benefits of this mode of operation is that production is never linear (problem if one of the resources is unavailable), the storage acting as a buffer between the resources in addition to providing each of them with autonomy.

Conventional warehouses are organized on the principle of vertical racks separated by aisles for the circulation of robots. The warehouse as described optimizes the surface area on the ground substantially since a significant portion of this does not have to be reserved for the circulation of robots (the robots circulate above the stored elements).

The storage capacity can be increased substantially by superposing and/or juxtaposing several warehouses as described.

The robots are characterized by their handling system making it possible to handle single parts, pallets, cases or vats with different dimensions or shapes.

The operation in three dimensions of the robots provides great modularity in the organization of the system. As a result, the robots can deposit or retrieve the elements they are responsible for over an infinite range of positions and heights. A workstation can be added or removed with no mechanical modification (addition or removal of a conveyor, modification of the running rails for the robots in the context of a conventional automated warehouse), simply by entering a new address to be handled.

The workstations are positioned around the warehouse. The functions of storage, handling and making available or retrieving production orders at the workstations, managing priority and buffer zone, are provided without requiring any complex switching or conveyor system.

It is clear that the present invention can receive any arrangements and variants of the field of technical equivalents without departing in any way from the framework of this patent, as defined by the claims below.

The invention claimed is:

1. Warehouse for items in the form of raw materials or basic components, that comprises:
 a plurality of item storage areas, at least one upper storage area, being superposed with at least one lower storage area, each storage area comprising a number of item storage locations formed on the floor of said storage area;
 at least one carrier able to move items from an upper storage area to a lower storage area, and vice versa;
 for each upper storage area, at least one manipulator robot able to pick up an item from one of the storage locations and transport it to the at least one carrier, and vice versa; and
 for each lower storage area, at least one manipulator robot able to pick up an item from one of the storage locations and transport it to a workstation, and vice versa, and able to pick up an item from the at least one carrier and transport it to one of the storage locations or to a workstation, and vice versa;
 each manipulator robot being able to move over a storage area during the transport;
 wherein at least one manipulator robot is mounted so as to be mobile on two horizontal rails fixedly installed above and at a distance from the storage area and above two sides of said storage area, and this manipulator robot comprises a motorized horizontal base mounted so as to be mobile on the two rails, said horizontal base being formed of two side-members perpendicular to the direction of the guide rails, said manipulator robot also comprising a motorized carriage mounted so as to be mobile on and along the two side-members of the motorized horizontal base, said motorized carriage bearing a grasping head movable towards and away from the storage area;

wherein the grasping head comprises a gripper comprising two opposed grasping claws, two vertical carrying arms respectively bearing the two grasping claws on their lower extremity, and an actuator motor mechanism for moving the two carrying arms further from or closer to each other;

wherein the actuator motor mechanism comprises a motor unit having a rotary output shaft coupled to a horizontal actuator screw, fixed in translation, comprising two opposed threaded areas, one of which has a right thread and the other a left thread, each threaded area receiving a threaded bush, fixed in rotation, one of the two carrying arms being borne by one of the threaded bushes and the other by the other threaded bush, and said carrying arms extending downwards from the threaded bushes;

wherein the gripper of the grasping head is borne on the lower extremity of a telescopic mount of the grasping head, said telescopic mount being deployable and retractable vertically under the action of a motor mechanism;

wherein the telescopic mount comprises a contained lower tubular element with a straight polygonal cross-section, and a containing upper tubular element with a straight polygonal cross-section, slidingly receiving the lower tubular element;

and wherein the motor unit is configured for actuating the horizontal screw, and wherein said screw and the threaded bushes are mounted in the lower tubular element and said lower tubular element comprises in a lower portion two longitudinal openings for the passage of the two carrying arms, the lower portion of each carrying arm and the grasping claws being outside the lower tubular element.

2. Warehouse according to claim 1, wherein each grasping claw is in the form of a flat horizontal partition fastened by one of its edges to the corresponding carrying arm.

3. Warehouse according to claim 1, comprising a supporting framework and several storage areas borne by the supporting framework, each one of said storage areas comprising its own manipulator robot.

4. Production unit for manufactured products, comprising:
 a warehouse according to claim 1; and
 at least one workstation near the warehouse,
 each workstation being positioned adjacent to a storage area of the warehouse.

* * * * *